United States Patent
Katzenberger et al.

(10) Patent No.: US 11,919,445 B2
(45) Date of Patent: Mar. 5, 2024

(54) VEHICLE STEERING WHEEL SYSTEM WITH AN ENERGY-SAVING ELECTROMECHANICAL TRIGGERING DEVICE FOR TRIGGERING AN ACOUSTIC OUTPUT

(71) Applicant: Preh GmbH, Saale (DE)

(72) Inventors: Oliver Katzenberger, Burglauer (DE); Stefan Wahl, Bad Neustadt a.d. Saale (DE); Dirk Ruetzel, Ebersburg (DE); Martin Schäfer, Hohenroth (DE); Sebastian Schrenk, Oberelsbach-Ginolfs (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 246 days.

(21) Appl. No.: 17/442,298

(22) PCT Filed: Feb. 17, 2020

(86) PCT No.: PCT/EP2020/054062
§ 371 (c)(1),
(2) Date: Sep. 23, 2021

(87) PCT Pub. No.: WO2020/200570
PCT Pub. Date: Oct. 8, 2020

(65) Prior Publication Data
US 2022/0153192 A1 May 19, 2022

(30) Foreign Application Priority Data

Apr. 1, 2019 (DE) .................... 10 2019 108 462.8
Jun. 25, 2019 (DE) .................... 10 2019 117 066.4

(51) Int. Cl.
*B60Q 5/00* (2006.01)
*B60R 16/03* (2006.01)
(Continued)

(52) U.S. Cl.
CPC .............. *B60Q 5/003* (2013.01); *G01L 5/221* (2013.01); *G08B 21/182* (2013.01); *B60R 16/03* (2013.01); *B60R 21/203* (2013.01); *B60R 21/215* (2013.01)

(58) Field of Classification Search
CPC ....... B60Q 5/003; G01L 5/221; G08B 21/182; B60R 16/03; B60R 21/203
See application file for complete search history.

(56) References Cited

U.S. PATENT DOCUMENTS

| 5,398,962 A | 3/1995 | Kropp |
| 5,898,238 A | 4/1999 | Dombrowski |

(Continued)

FOREIGN PATENT DOCUMENTS

| DE | 10100257 A1 | 7/2002 |
| DE | 102008046382 A1 | 3/2010 |

(Continued)

OTHER PUBLICATIONS

Pelz et al [DE 10 2016 106 280] English Translation, Patent Translate, EPO dated Jul. 27, 2023 (Year: 2023).*

(Continued)

*Primary Examiner* — John A Tweel, Jr.
(74) *Attorney, Agent, or Firm* — M&B IP Analysts, LLC

(57) ABSTRACT

A vehicle steering wheel system is provided. The system includes a steering wheel body with a hub region for attachment to a steering shaft of a vehicle steering system, a steering wheel rim and at least one spoke for attaching the steering wheel rim to the hub region; an electromechanical triggering device for triggering an acoustic output by means of an acoustic warning device of the vehicle, wherein the triggering device has an impact absorber cover and at least one force transducer wherein a force value threshold is predefined for each force transducer, and a wake-up signal (Continued)

is transmitted via the data connection to the evaluation unit if the force value threshold is exceeded by at least one force value, so that the latter changes from the energy-saving mode into the operating mode in which an actuating force value is determined by force value measured by the at least one force transducer.

17 Claims, 3 Drawing Sheets

(51) Int. Cl.
*G01L 5/22* (2006.01)
*G08B 21/18* (2006.01)
*B60R 21/203* (2006.01)
*B60R 21/215* (2011.01)

(56) References Cited

U.S. PATENT DOCUMENTS

| | | |
|---|---|---|
| 6,236,309 B1 | 5/2001 | Haag et al. |
| 9,176,636 B1 | 11/2015 | Maharyta et al. |
| 9,738,220 B2 * | 8/2017 | Borghi .................. B60Q 5/003 |
| 10,391,934 B2 * | 8/2019 | Leforestier ............ G01L 1/2225 |
| 11,414,038 B2 * | 8/2022 | Schmeier .......... B60R 21/21658 |
| 2022/0153193 A1 * | 5/2022 | Katzenberger ......... B62D 1/046 |

FOREIGN PATENT DOCUMENTS

| | | |
|---|---|---|
| DE | 102009011623 A1 | 9/2010 |
| DE | 102008049847 | 10/2010 |
| DE | 102016106280 A1 | 10/2017 |
| DE | 102017008728 A1 | 3/2019 |

OTHER PUBLICATIONS

International Search Report and Written Opinion of International Searching Authority for PCT/EP2020/054062, ISA/NL, Rijswijk, Netherlands, dated Apr. 29, 2020.

* cited by examiner

VEHICLE STEERING WHEEL SYSTEM WITH AN ENERGY-SAVING ELECTROMECHANICAL TRIGGERING DEVICE FOR TRIGGERING AN ACOUSTIC OUTPUT

The present disclosure relates to a vehicle steering wheel system with an energy-saving electromechanical triggering device for triggering an acoustic output by means of an acoustic warning device of the vehicle, i.e. for outputting an acoustic horn signal by means of a motor vehicle horn, for example. A vehicle steering wheel typically has a hub region (also called hub in short) for attachment to a steering shaft, a steering wheel rim and at least one spoke for attaching the steering wheel rim to the hub region.

In this case, the impact absorber cover covering the hub of the steering wheel typically forms the operating surface for an electromechanical button, by the impact absorber cover being mounted in such a way that it can be pressed down in order to trigger the horn. The triggering should only be effected in the case of a targeted, intended actuation, and not in the case of an accidental contact. There is a need for carrying out the triggering by means of the electromechanical triggering device in a more reliable and accurate manner. Thus, the effort for determining the actuating force to be made with regard to electrical and, if necessary, software engineering increases. This is in conflict with the fundamental requirement of saving energy, particularly if the vehicle is at least temporarily to be operated by an electric rechargeable battery.

The present disclosure is therefore based on the object of providing a vehicle steering wheel system with an energy-saving electromechanical triggering device for triggering an acoustic output (horn signal) by means of an acoustic warning device of the vehicle. According to the present disclosure, the object is achieved by a vehicle steering wheel system with the features of claim 1. An equally advantageous use and a corresponding method are each the subject matter of the independent claims. It must be noted that the features and measures cited individually in the following description can be combined with each other in any technologically meaningful manner and represent other embodiments of the present disclosure. The description, in particular in connection with the figures, additionally characterizes and specifies the present disclosure.

The vehicle steering wheel system according to the present disclosure includes a steering wheel body, also called steering wheel in short. The steering wheel body has a hub region configured for attachment to a steering shaft, which is usually disposed in a so-called steering column, a steering wheel rim and at least one spoke for attaching the steering wheel rim to the hub region. In this case, the steering wheel rim forms the gripping surface of the steering wheel and is usually, but not necessarily, formed as a closed ring. Thus, an embodiment of the present disclosure is also conceivable in which the steering wheel rim forms only a part of the ring. For example, the steering wheel rim in one embodiment forms a so-called steering horn as a gripping surface, which is carried by a single spoke, or forms a half to three-quarter circle in another embodiment, wherein the latter is carried by one, two or more spokes.

Preferably, the vehicle steering wheel according to the present disclosure further comprises an airbag initiation device. For example, this includes a gas bag (also referred to as an "air bag"), a gas bag holder, a generator for generating a gas filling the gas bag, and a generator support.

According to the present disclosure, an electromechanical triggering device is also provided for triggering an acoustic output by means of an acoustic warning device of the vehicle. The triggering device provided according to the present disclosure has an impact absorber cover (also called "cap" in short), which is disposed on the steering wheel body and at least partially covers the hub region while forming an actuating surface. In one configuration, the impact absorber cover serves for accommodating and fixing the airbag initiation device. Preferably, however, it is configured so as to bridge an accommodating space, which is provided between the hub region and the impact absorber cover and provided for at least partially accommodating the airbag initiation device.

For example, the airbag initiation device is fixed either exclusively to the impact absorber cover or exclusively to the steering wheel body, particularly to the hub region. According to the present disclosure, the impact absorber cover is mounted on the steering wheel body, such as on the steering wheel hub, so as to be displaceable, in an elastically self-resetting manner, in the direction of the hub region under the influence of an actuating force on the actuating surface, and/or configured so as to be deformable, in an elastically self-resetting manner, in the direction of the hub region.

According to the present disclosure, the electromechanical triggering device further has at least one force transducer, which is disposed between the impact absorber cover and the steering wheel body, such as the hub region, and via which the impact absorber cover is supported on the steering wheel body, for measuring a force value that can be associated with an actuating force acting on the actuating surface of the impact absorber cover. For example, the force transducer is eccentrically disposed relative to the steering shaft, i.e. laterally offset from the axis defined by the steering shaft.

According to the present disclosure, the electromechanical triggering device further has, for each force transducer, an electronic evaluation system connected in an electrically conductive manner to the force transducer. An electronic evaluation system is understood to be an electronic circuit, for example as an integrated electronic circuit, for providing a force value obtained by means of the force transducer and proportional to the respective actuating force. Moreover, an evaluation unit, preferably exactly one, is provided, which is superordinate to the electronic evaluation system or systems and can be selectively operated in an energy-saving mode and an operating mode. For example, an energy-saving mode is understood to be a mode in which, in contrast to the operating mode, the processor clock and/or the processor supply voltage of at least one processor belonging to the evaluation unit is reduced as compared with the operating mode. Preferably, the energy-saving mode is characterized in that the data exchange via the data connection between the at least one force transducer and the evaluation unit is reduced, more preferably limited to the transmission of the wake-up signal. Energy can be saved in an advantageous manner by the energy-saving mode according to the present disclosure.

In one configuration, the evaluation unit is one of the electronic evaluation systems belonging to a force transducer, wherein it is operated as a master and the remaining electronic evaluation systems are operated as slaves. Due to the hierarchical structure, the electronic evaluation system of each force transducer is in each case connected via a data connection, such as a data bus (I2C bus), to the superordinate evaluation unit.

According to the present disclosure, one force value threshold is predefined for each force transducer. When at least one force value threshold is exceeded by one of the force values, a wake-up signal is transmitted via the data connection to the evaluation unit, e.g. as an interrupt via a separate interrupt line, if necessary, so that it changes from the energy-saving mode into the operating mode, in which an actuating force value is determined by means of the force value measured by the at least one force transducer, in order to trigger the acoustic output of the acoustic warning device of the vehicle if necessary, e.g. if a predefined actuating force value is exceeded.

For example, the precedent change from the operating mode into the energy-saving mode takes place when each of the force values has dropped below a predefined switch-off force threshold predefined for each force transducer, preferably when the total of all force values has dropped below one predefined switch-off total force threshold, more preferably when the determined actuation force has dropped below a predefined actuating force threshold. Preferably, the change into the energy-saving mode is triggered only if each of the force values has remained below the associated triggering force value for a predefined duration, or the total of all force values has remained below the predefined switch-off total force threshold for the predefined duration, or the actuating force has remained below the predefined switch-off actuation force threshold for the predefined duration. In one configuration, the switch-off force threshold corresponds in each case to the predefined force threshold controlling the change into the operating mode.

Preferably, several force transducers with an associated electronic evaluation system, which are distributed around the steering shaft, are provided that are each connected to the evaluation unit via at least one data connection in order to increase the accuracy of the actuation force determination.

Preferably, the electronic evaluation system of each force transducer can be selectively operated in an energy-saving mode and an operating mode. Further, a change of the electronic evaluation system from the energy-saving mode into the operating mode, in which force values are determined, can be triggered by the evaluation unit.

Preferably, at least two, e.g. three, force transducers are provided.

Preferably, the force transducer is designed to measure the force value optically, capacitively, inductively or resistively. Preferably, an optically measuring force transducer is used. For example, an optical reflection measuring method is used in which the light intensity or the travel time of the light varies with the force to be measured.

In one configuration, the vehicle steering wheel system according to the present disclosure comprises an acoustic warning device for outputting an acoustic warning signal.

Furthermore, the present disclosure relates to the use of the vehicle steering wheel system in one of the above described embodiments in a vehicle, particularly in a motor vehicle.

The present disclosure further relates to a method for triggering an acoustic output by an acoustic warning device of the vehicle, comprising the following steps:

In a providing step, a vehicle steering wheel system is provided. This system includes a steering wheel body. The steering wheel body includes a hub region for attachment to a steering shaft of a vehicle steering system, a steering wheel rim and at least one spoke for attaching the steering wheel rim to the hub region. Preferably, an airbag initiation device is also provided.

According to the present disclosure, an electromechanical triggering device is provided for triggering the acoustic output by means of the acoustic warning device of the vehicle. The triggering device provided has an impact absorber cover, which is disposed on the steering wheel body and at least partially covers the hub region while forming an actuating surface. Preferably, the impact absorber cover bridges an accommodating space, which is provided between the hub region and the impact absorber cover and provided for at least partially accommodating the airbag initiation device.

According to the present disclosure, the provided impact absorber cover is mounted on the steering wheel body so as to be displaceable, in an elastically self-resetting manner, in the direction of the hub region under the influence of an actuating force on the actuating surface, and/or configured so as to be deformable, in an elastically self-resetting manner, in the direction of the hub region. According to the present disclosure, the electromechanical triggering device further has at least one force transducer, which is disposed between the impact absorber cover and the steering wheel body and via which the impact absorber cover is supported on the steering wheel body. Furthermore, the electromechanical triggering device has, for each force transducer, an electronic evaluation system connected in an electrically conductive manner to the force transducer, and an evaluation unit, preferably exactly one, which is superordinate to the electronic evaluation system or systems and can be selectively operated in an energy-saving mode and an operating mode, wherein the electronic evaluation system is connected via a data connection to the superordinate evaluation unit and one force value threshold is predefined for each force transducer.

In a measuring step, a force value, which can be associated with an actuating force acting on the actuating surface of the impact absorber cover, is measured by means of the at least one force transducer. In the case of several force transducers, several force values are measured.

In a step of comparing, the force value is compared to the respectively associated force value threshold, wherein a wake-up signal, also referred to as a waking signal, is transmitted via the data connection to the evaluation unit exclusively when the force value threshold is exceeded by at least one force value.

The wake-up signal triggers a change from the energy-saving mode into the operating mode as soon as the wake-up signal is received by the evaluation unit.

Subsequent operation of the evaluation unit in the operating mode, in which an actuating force value is determined by means of the force value measured by the force transducer;

If necessary, for example when a predefined actuating force value is exceeded by the actuating force value, the evaluation unit causes a triggering of the acoustic output of the acoustic warning device of the vehicle.

It is preferably provided that, further, all electronic evaluation systems can be selectively operated in an energy-saving mode and an operating mode, and at least one change of the type of operation of the electronic evaluation systems from, in each case, the energy-saving mode into the operating mode is triggered by the evaluation unit, more preferably prior to the actuating force value being determined in the operating mode of the evaluation unit.

For example, a change from the operating mode into the energy-saving mode of the electronic evaluation systems can also be triggered by the evaluating unit. More preferably, the electronic evaluation system is capable of changing from the operating mode into the energy-saving mode autonomously in each case.

According to a preferred embodiment of the method according to the present disclosure, the force transducer is designed in each case to measure the force value optically, capacitively, inductively or resistively in each case.

Preferably, it is provided that the change from the energy-saving mode into the operating mode is preceded in time by a change from the operating mode into the energy-saving mode, and the change from the operating mode into the energy-saving mode is triggered by each force value having dropped below one predefined switch-off force threshold in each case, preferably by the actuating force value having dropped below a predefined switch-off actuating force threshold, more preferably in each case for a predefined duration.

The various embodiments as well as the technical environment will be explained in more detail below with reference to the Figures. It must be remarked that the Figures depict a particularly preferred embodiment of the disclosed embodiments, but that the disclosed embodiments are not limited thereto. In the Figures.

Figure 3:
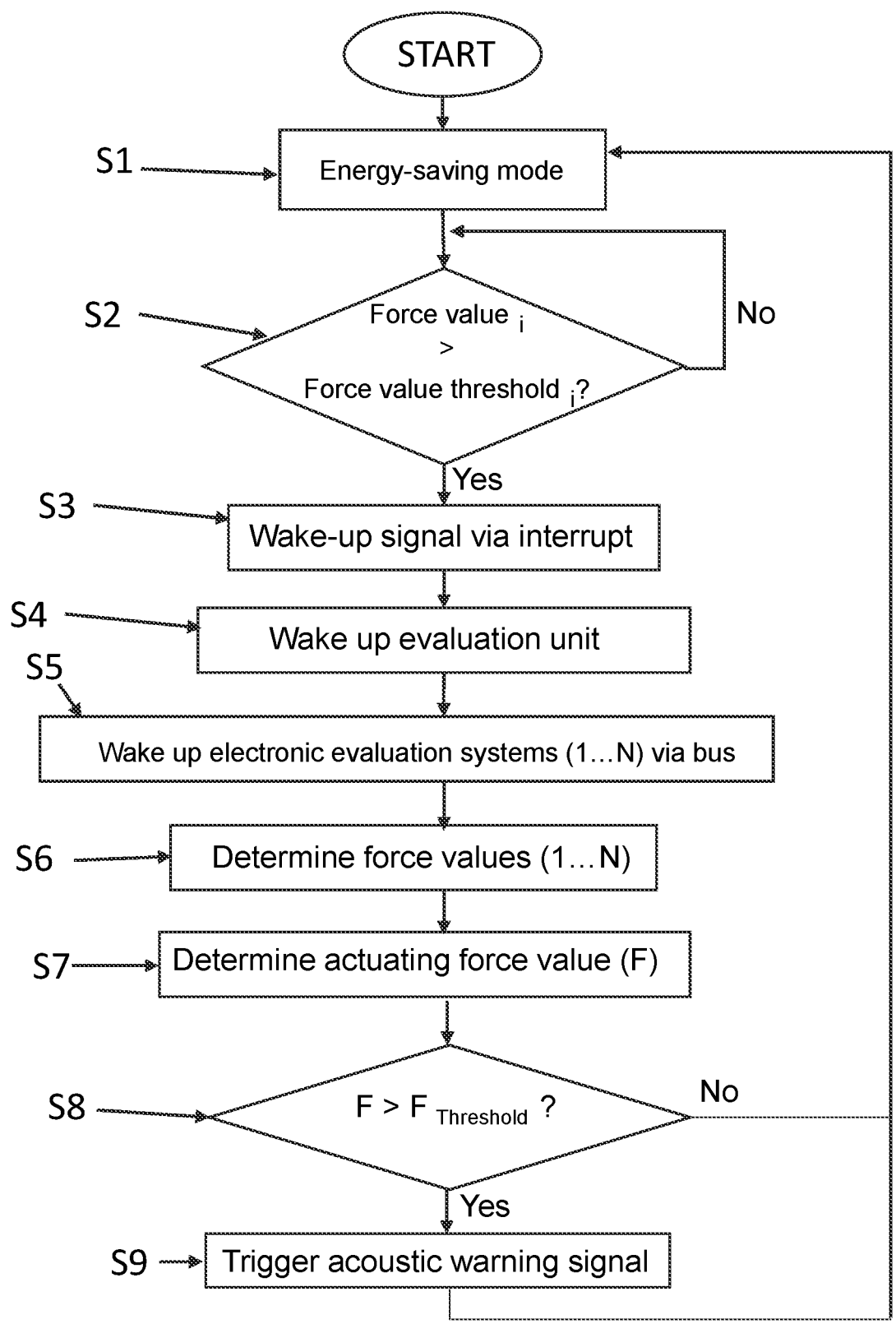

FIG. 3 a schematic depiction of the method according to an embodiment.

The vehicle steering wheel system 1 according to the embodiment includes a vehicle steering wheel body 2 and an electromechanical triggering device 7. The latter comprises an impact absorber cover 8 disposed on the steering wheel body 2. The steering wheel body 2 comprises a central hub region 2b serving for non-rotatably fixing the steering wheel body 2 to a steering shaft 10, which is usually arranged in a steering column. The steering wheel body 1 further comprises an annular steering wheel rim 2a, which is attached to the hub region 2b via several spokes 2c. To an operator operating the vehicle steering wheel system 1, the impact absorber cover 8 is arranged on the side of the steering wheel body 2 facing towards him in such a way that the impact absorber cover 8 covers the hub region 2b. Under the impact absorber cover 8 and between the latter and the steering wheel body 2, more specifically between the impact absorber cover 8 and the hub region 2b, three force transducers 3a, 3b, 3c are disposed, which respectively determine a force value and which further serve for movably mounting, in an elastically self-resetting manner, the impact absorber cover 8 on the hub region 2b of the steering wheel body 2.

The force transducer 3a, 3b, 3c associated with the electromechanical triggering device 7 serve for the actuation force-dependent triggering of an acoustic output, also called horn signal, by an acoustic warning device of the vehicle, which is not depicted. For example, these are optical, capacitive, inductive or MEMS force sensors 3a, 3b, 3c. The force transducers 3a, 3b, 3c each have an associated electronic evaluation system 4a, 4b and 4c, wherein the latter are connected to a superordinate evaluation unit 9 via a bus (e.g. I2C) as a data connection 5a, 5b, 5c. Moreover, each of the electronic evaluation systems 5a, 5b, 5c is connected via an interrupt line 6a, 6b, 6c to the evaluation unit 9 in order to be able to transmit a wake-up signal from the electronic evaluation systems 4a, 4b, 4c to the evaluation unit 9 or vice versa. The electronic evaluation systems 4a, 4b, 4c transmit the force values measured by the force transducers 3a, 3b, 3c in each case via the bus 5a, 5b, 5c to the evaluation unit 9.

The latter can be selectively operated in an energy-saving mode and an operating mode, wherein the change from the energy-saving mode into the operating mode can be triggered by receiving at least one wake-up signal via the interrupt lines 6a, 6b, 6c. If the evaluating unit 9 is operated in the operating mode, the force values are then processed electronically, and an actuating force is determined as a total force, as well as, optionally, the location of the action of the actuating force. If this is greater than an actuating force threshold value predefined for triggering, the vehicle horn is activated, e.g. by means of a signal via the vehicle bus or hard wiring.

Figure 1:
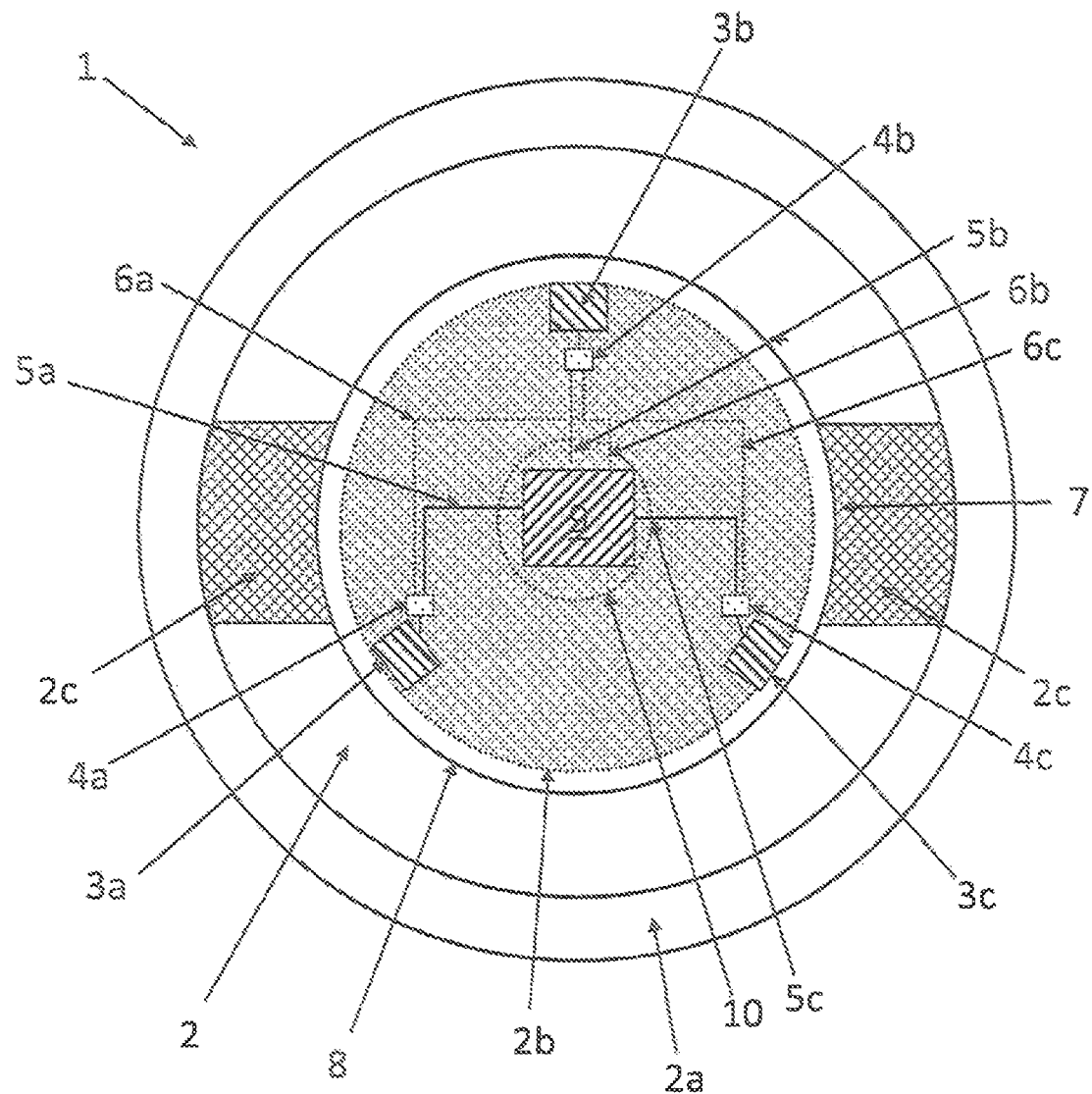
FIG. 1 shows a schematic top view or view through an embodiment of the vehicle steering wheel system.
Figure 2:
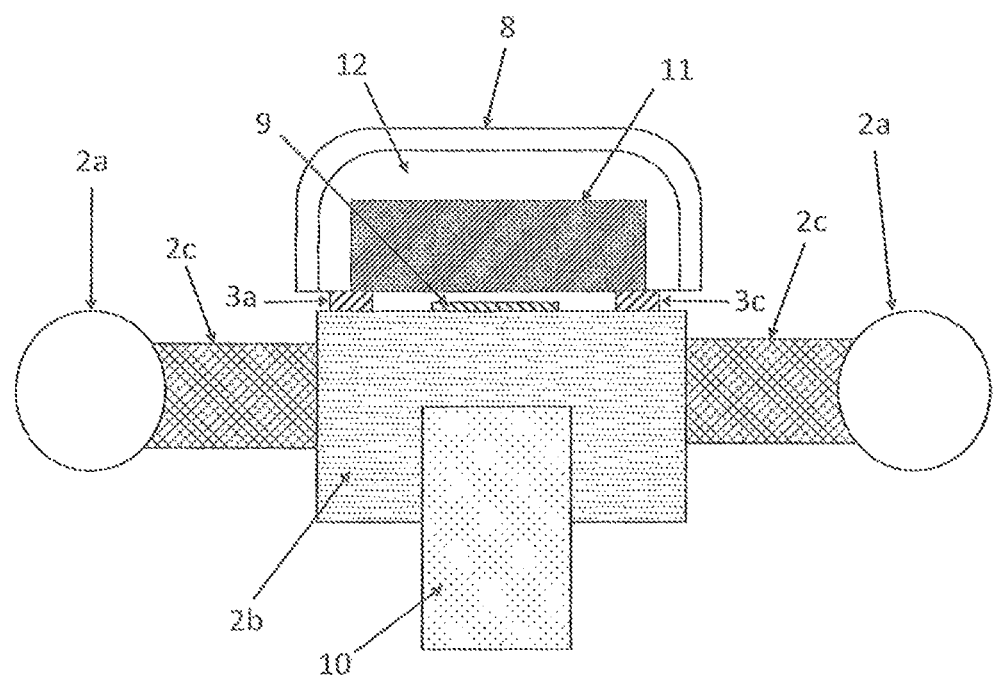
FIG. 2 shows a schematic horizontal sectional view of the embodiment shown in FIG. 1.

In order to save energy, at least the evaluation unit 9 and preferably also the electronic evaluation systems 4a, 4b, 4c of the force transducers 3a, 3b, 3c, e.g., in the case of a switched-off "ignition", are operated in the energy-saving mode, also referred to as "sleep mode". This means, for instance, that only a few basic functions of the respective component are active. In the sleep mode, for example, the electronic evaluation systems 4a, 4b, 4c are operated in such a manner that the interval in time of the force value determination is increased in the energy-saving mode as compared with the operating mode. Preferably, the energy-saving mode is characterized in that no data exchange takes place between the force transducers 3a, 3b, 3c and the evaluation unit 9 via the bus 5a, 5b, 5c. FIG. 2 shows a section through the vehicle steering wheel system 1 according to the embodiment. As is shown therein, the impact absorber cover 8 is configured so as to bridge an accommodating space 12, which faces towards the hub region 2b and in which an airbag initiation device 11 is accommodated. The airbag initiation device 11 is fixed to the hub region 11. The method for triggering an acoustic output by an acoustic warning device of the vehicle is explained with reference to the schematic depiction of FIG. 3. In the step denoted "Start", a vehicle steering wheel system, as it was described with reference to FIGS. 1 and 2, for example, is provided. In step S1, it is in the energy-saving mode. One force value threshold is predefined for each force transducer 3a, 3b, 3c from FIG. 1. If, in step S2, this force value threshold is exceeded in the energy-saving mode by one of the force values determined by the force transducers 3a, 3b, 3c from FIG. 1, then a wake-up signal is transmitted via the interrupt lines 6a, 6b, 6c of FIG. 1 to the evaluation unit 9 in step S3. In step S4, the latter changes from the energy-saving mode into the operating mode and in step S5 activates all electronic evaluation systems 4a, 4b, 4c of the force transducers 3a, 3b, 3c by means of a corresponding wake-up signal via the bus 5a, 5b, 5c, in order to initiate a measurement and transmission of the associated force values to the evaluation unit 9 in step S6. In step S7, the latter determines the actuating force F; if that is greater than the actuating force value threshold $F_{Threshold}$ in step S8, then the horn, i.e., the acoustic warning signal, is activated. In the event the actuating force threshold $F_{Threshold}$ is not exceeded for a predefined duration, the electronic evaluation system 9, and in particular the electronic evaluation systems 4a, 4b, 4c, are returned to the energy-saving mode.

What is claimed is:

1. A vehicle steering wheel system, comprising:
   a steering wheel body with a hub region for attachment to a steering shaft of a vehicle steering system, with a steering wheel rim and with at least one spoke for attaching the steering wheel rim to the hub region;
   an electromechanical triggering device for triggering an acoustic output by an acoustic warning device of the vehicle, wherein the electromechanical triggering device has an impact absorber cover, which is disposed on the steering wheel body and covers the hub region at least partially while forming an actuating surface, wherein the impact absorber cover is mounted on the steering wheel body so as to be at least one of displaceable, in an elastically self-resetting manner, under the influence of an actuating force on the actuating surface in the direction of the hub region, and deformable, in an elastically self-resetting manner, in the direction of the hub region;

wherein the electromechanical triggering device further has a plurality of force transducers, each of which is disposed between the impact absorber cover and the steering wheel body and via which the impact absorber cover is supported on the steering wheel body, for measuring a force value that can be associated with the actuating force acting on the actuating surface of the impact absorber cover;

wherein the electromechanical triggering device further has, for each of at least two of the force transducers, a respective electronic evaluation system, each of the electronic evaluation systems being connected in an electrically conductive manner to its respective force transducer and also to an evaluation unit, which is superordinate to the electronic evaluation systems and can be selectively operated in an energy-saving mode and an operating mode, wherein each of the electronic evaluation systems is connected to the evaluation unit via at least one data connection, wherein a force value threshold is predefined for each force transducer and a wake-up signal is transmitted via the at least one data connection to the evaluation unit exclusively when the force value threshold is exceeded by at least one force value, so that the evaluation unit changes from the energy-saving mode into the operating mode in which an actuating force value is determined by means of the force value measured by at least one of the force transducers in order to trigger the acoustic output of the acoustic warning device of the vehicle when a predefined actuating force value is exceeded.

2. The vehicle steering wheel system according to claim 1, wherein at least two of the force transducers are eccentrically disposed relative to the steering shaft.

3. The vehicle steering wheel system according to claim 1, further comprising an airbag initiation device, and wherein the impact absorber cover is configured so as to bridge an accommodating space, which is provided between the hub region and the impact absorber cover and provided for at least partially accommodating the airbag initiation device.

4. The vehicle steering wheel system according to claim 1, wherein further all electronic evaluation systems can be selectively operated in an energy-saving mode and an operating mode, and a change of the electronic evaluation systems from the energy-saving mode into the operating mode is triggered by the evaluation unit.

5. The vehicle steering wheel system according to claim 1, wherein least one of the force transducers measures the force value optically, capacitively, inductively or resistively.

6. The vehicle steering wheel system according to claim 1, wherein the evaluation unit is configured such that the change from the energy-saving mode into the operating mode is preceded in time by a change from the operating mode into the energy-saving mode, and the change from the operating mode into the energy-saving mode is triggered by each force value having dropped below one predefined switch-off force threshold in each case.

7. The vehicle steering wheel system according to claim 1 is used in a vehicle.

8. A method for use in triggering an acoustic output by an acoustic warning device of a vehicle having a steering wheel system comprising:

a steering wheel body with a hub region for attachment to a steering shaft of a vehicle steering system, with a steering wheel rim and with at least one spoke for attaching the steering wheel rim to the hub region;

an electromechanical triggering device for triggering an acoustic output by an acoustic warning device of the vehicle, wherein the electromechanical triggering device has an impact absorber cover, which is disposed on the steering wheel body and covers the hub region at least partially while forming an actuating surface, wherein the impact absorber cover is mounted on the steering wheel body so as to be at least one of displaceable, in an elastically self-resetting manner, under the influence of an actuating force on the actuating surface in the direction of the hub region, and deformable, in an elastically self-resetting manner, in the direction of the hub region;

wherein the electromechanical triggering device further has a plurality of force transducers, each of which is disposed between the impact absorber cover and the steering wheel body and via which the impact absorber cover is supported on the steering wheel body, for measuring a force value that can be associated with the actuating force acting on the actuating surface of the impact absorber cover;

wherein the electromechanical triggering device further has, for each of at least two of the force transducers, a respective electronic evaluation system, each of the electronic evaluation systems being connected in an electrically conductive manner to its respective force transducer and also to an evaluation unit, which is superordinate to the electronic evaluation systems and can be selectively operated in an energy-saving mode and an operating mode, wherein each of the electronic evaluation systems is connected to the evaluation unit via at least one data connection, wherein a force value threshold is predefined for each force transducer;

the method, comprising:

measuring a force value, associated with an actuating force acting on the actuating surface of the impact absorber cover, by at least one of the force transducers;

comparing the measured force value to the force value threshold, wherein a wake-up signal is transmitted via the at least one data connection to the evaluation unit exclusively when the force value threshold is exceeded by at least one force value;

changing from the energy-saving mode into the operating mode if the wake-up signal is received by the evaluation unit;

subsequent operation of the evaluation unit in the operating mode, in which an actuating force value is determined by means of the force value measured by the at least one force transducer;

when a predefined actuating force value is exceeded by the actuating force value, causing the triggering of the acoustic output of the acoustic warning device of the vehicle by the evaluation unit.

9. The method according to claim 8, wherein all of the electronic evaluation systems can be selectively operated in an energy-saving mode and an operating mode, and at least one change of the electronic evaluation systems from, in each case, the energy-saving mode into the operating mode is triggered by the evaluation unit.

10. The method according to claim 8, wherein least one of the force transducers measures the force value optically, capacitively, inductively or resistively.

11. The method according to claim 8, wherein the change from the energy-saving mode into the operating mode is preceded in time by a change from the operating mode into the energy-saving mode, and the change from the operating mode into the energy-saving mode is triggered by each force value having dropped below one predefined switch-off force threshold in each case.

12. The method according to claim 9, wherein the at least one change of the electronic evaluation systems from, in each case, the energy-saving mode into the operating mode is triggered by the evaluation unit prior to the actuating force value being determined in the operating mode of the evaluation unit.

13. The method according to claim 11, wherein the change from the operating mode into the energy-saving mode is triggered by the actuating force value having dropped below a predefined switch-off actuating force threshold.

14. The method according to claim 11, wherein the change from the operating mode into the energy-saving mode is triggered by the actuating force value having dropped below a predefined switch-off actuating force threshold for a predefined duration.

15. The vehicle steering wheel system according to claim 6, wherein the change from the operating mode into the energy-saving mode is triggered by the total of all force values having dropped below one predefined switch-off total force threshold in each case.

16. The vehicle steering wheel system according to claim 6, wherein the change from the operating mode into the energy-saving mode is triggered by the total of all force values having dropped below one predefined switch-off total force threshold for a predefined duration.

17. A vehicle steering wheel system, comprising:
- a steering wheel body with a hub region for attachment to a steering shaft of a vehicle steering system, with a steering wheel rim and with at least one spoke for attaching the steering wheel rim to the hub region;
- an electromechanical triggering device for triggering an acoustic output by an acoustic warning device of the vehicle, wherein the electromechanical triggering device has an impact absorber cover, which is disposed on the steering wheel body and covers the hub region at least partially while forming an actuating surface, wherein the impact absorber cover is mounted on the steering wheel body so as to be at least one of displaceable, in an elastically self-resetting manner, under the influence of an actuating force on the actuating surface in the direction of the hub region, and deformable, in an elastically self-resetting manner, in the direction of the hub region;
- wherein the electromechanical triggering device further has at least one force transducer, which is disposed between the impact absorber cover and the steering wheel body and via which the impact absorber cover is supported on the steering wheel body, for measuring a force value that can be associated with the actuating force acting on the actuating surface of the impact absorber cover;
- wherein the electromechanical triggering device further has, for each of the at least one force transducer, an electronic evaluation system connected in an electrically conductive manner to the respective at least one force transducer and an evaluation unit, which is superordinate to the electronic evaluation system or systems and can be selectively operated in an energy-saving mode and an operating mode, wherein the electronic evaluation system is connected to the evaluation unit via at least one data connection in each case, wherein a force value threshold is predefined for each of the at least one force transducer and a wake-up signal is transmitted via the at least one data connection to the evaluation unit exclusively if the force value threshold is exceeded by at least one force value, so that the latter changes from the energy-saving mode into the operating mode in which an actuating force value is determined by means of the force value measured by the at least one force transducer in order to trigger the acoustic output of the acoustic warning device of the vehicle when a predefined actuating force value is exceeded; and
- wherein further all electronic evaluation systems can be selectively operated in an energy-saving mode and an operating mode, and a change of the electronic evaluation systems from the energy-saving mode into the operating mode is triggered by the evaluation unit.

* * * * *